Aug. 26, 1930.          J. F. WHITE          1,773,765
ANIMAL RACING APPARATUS
Filed Jan. 12, 1927      2 Sheets-Sheet 1

Inventor
John F. White
By Walter M. Fuller
atty.

Aug. 26, 1930.   J. F. WHITE   1,773,765
ANIMAL RACING APPARATUS
Filed Jan. 12, 1927   2 Sheets-Sheet 2
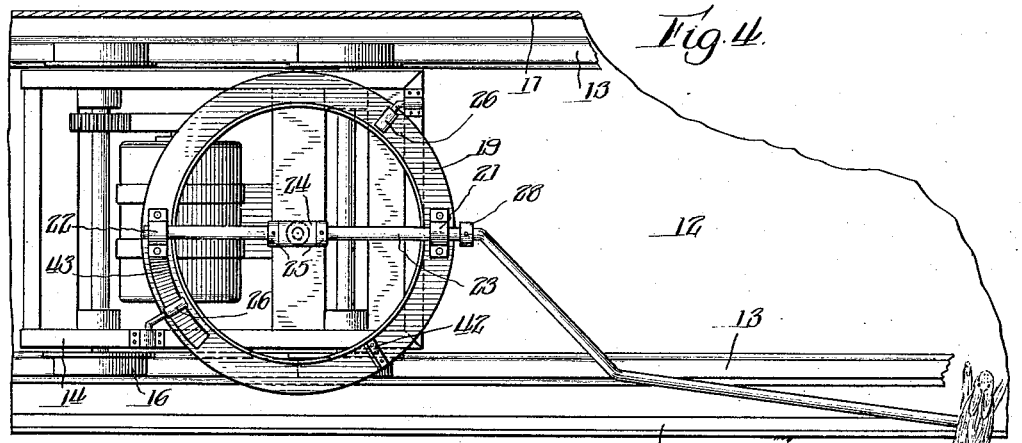
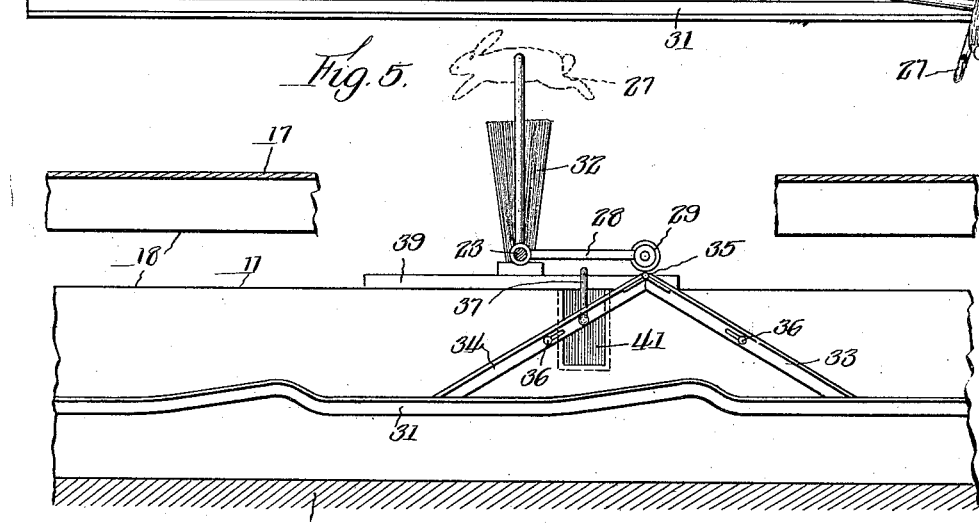
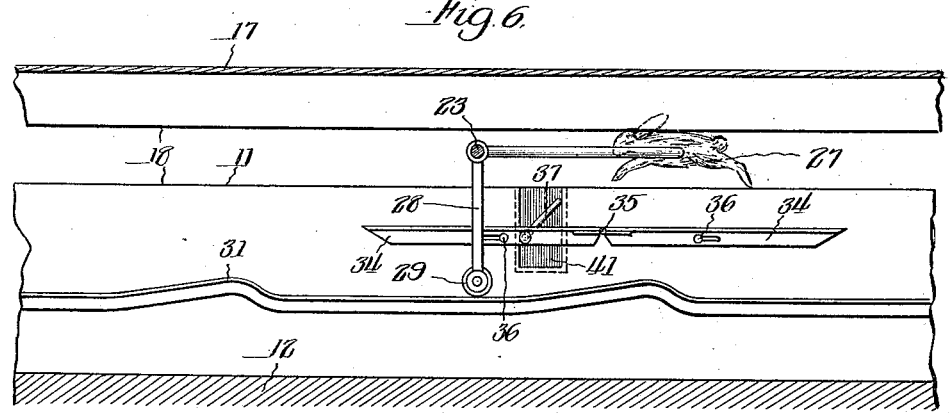

Patented Aug. 26, 1930

1,773,765

UNITED STATES PATENT OFFICE

JOHN F. WHITE, OF CHICAGO, ILLINOIS, ASSIGNOR TO HARRY B. STAVER, OF CHICAGO, ILLINOIS

ANIMAL-RACING APPARATUS

Application filed January 12, 1927. Serial No. 160,535.

My invention relates to means for carrying a lure or bait in advance of racing animals on a race-track to incite them to develop their best speed efforts, its especial object being to so mount and convey the lure, desirably, but not necessarily in the form of a rabbit, that its movements will closely counterfeit those of a free animal attempting by its swift and nimble endeavors to escape from the pursuing pack of dogs.

To enable those skilled in this art to fully understand the invention both from structural and functional standpoints, in the accompanying drawings, forming a part of this specification, and throughout the several views of which like reference characters have been employed to designate the same parts, I have illustrated a present desirable and preferred embodiment of the invention.

In these drawings:

Figure 4 is a plan view of the construction showing the rabbit supporting-arm swung in to inoperative position;

Figure 5 is a longitudinal section of a portion of the construction illustrating the means for causing the rabbit to jump over the hurdle; and Figure 6 is a similar view showing the means for causing the rabbit to make the ordinary leaps or jumps.

Figure 1:
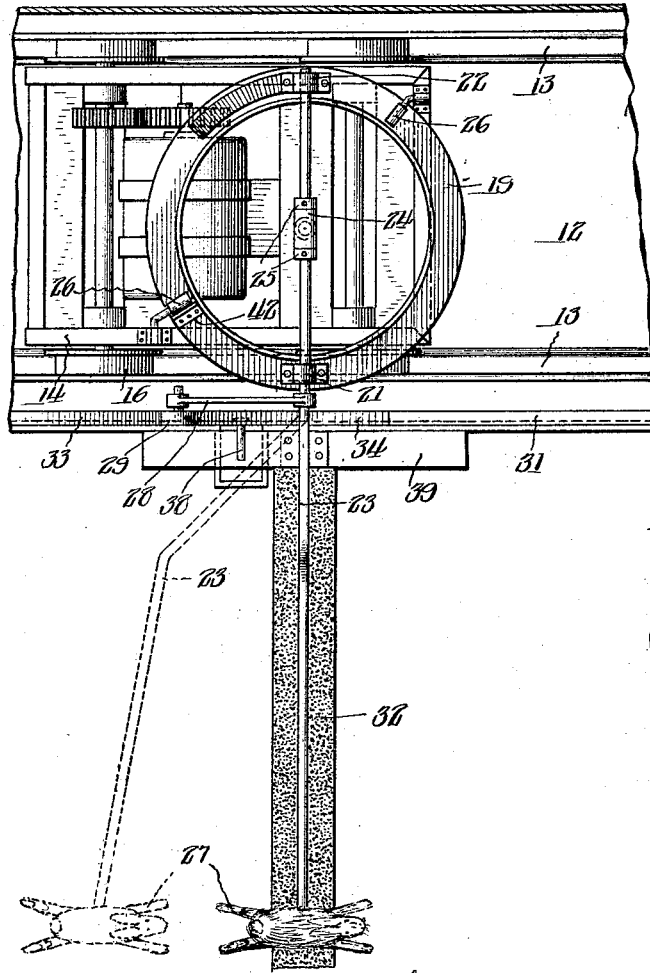
Figure 1 is a plan view of the improved structure.
Figure 3:
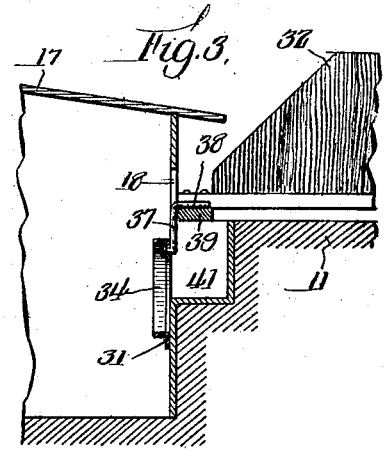
Figure 3 is a fragmentary detail section of the means for causing the rabbit to leap over a hurdle or barrier.

Referring to these drawings, it will be seen that alongside of the race course 11 on which the dogs race, there is a depressed, covered track-way 12 with the usual pair of rails 13, 13 on which an electric car or truck 14 is designed to travel at comparatively high speed, such car being driven by its electric-motor 15 through suitable gearing connected to one of the axles of its carrying wheels 16, 16.

The race-track 11 has the housing 17 beside it covering the trackway and opened along the race-course at 18.

As is usual in constructions of this character, the speed of travel of the car or truck and its cessation of movement is easily controlled from a distance in any approved and well-understood manner.

Such electric-car is provided for the purpose of carrying a lure or decoy over the race-course in advance of the racing animals which are incited to speed by reason of their pursuit of the rapidly traveling lure, usually in the form of a rabbit.

Figure 2:
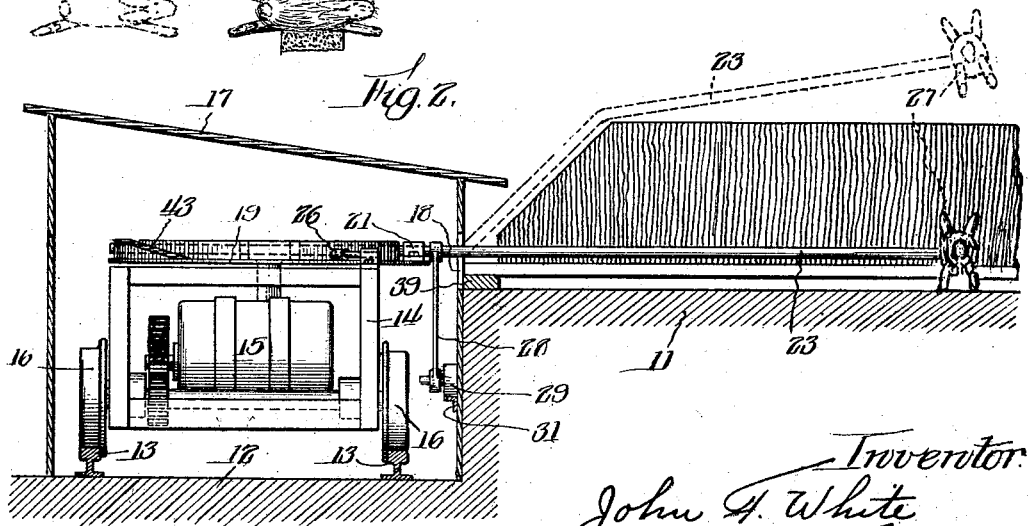
Figure 2 is a cross-section of the race-course and shows the new mechanism in end elevation.

To this end, a circular metal member 19 has bearings 21 and 22 diametrically opposite one another for the accommodation of a relatively-long shaft 23, the extended portion of which is somewhat bent or offset as shown in dotted lines in Figures 1 and 2 and in full lines in Figure 4.

Such shaft is provided with a bearing member 24 between two confining or positioning collars 25, 25 and oscillatory in that part of the car-track frame immediately beneath it so that under certain circumstances, the ring member and the parts which it carries may turn horizontally approximately ninety degrees about such center which capacity for movement can be readily understood by a comparison of Figures 1 and 4.

In order to prevent the supporting ring or circular frame 19 and its outstanding shaft arm from tilting unduly, the truck or car-frame is equipped with a plurality of rollers 26, 26 overlying such ring and bearing on its top surface, the far or extended end of the oscillatory bent shaft or arm having a decoy rabbit 27 fixedly mounted thereon.

Shaft 23 has a depending arm 28 fixed thereon carrying an anti-friction roller 29 at its lower end designed and adapted to roll on the top surface of a stationary cam-track 31 mounted on one of the vertical walls of the passage or chamber in which the car or truck travels.

Obviously, as the car moves along, the slight spaced elevations in the cam-track by cooperation with the roller will cause the bent shaft to oscillate in its bearings and its overhanging portion to rock up and down somewhat whereby the corresponding ascents and descents of the decoy rabbit combined with its travel over the ground due to the moving car will closely simulate or counterfeit the ordinary jumping actions of a live rabbit.

Hurdles 32 are employed in some but not all races of this character and means are supplied in the mechanism for causing the rabbit to make higher jumps or leaps over them.

For each such hurdle, the cam-track 31 is equipped with auxiliary or supplementary elevations or high sections which may be rendered operative or inactive at will, each such section comprising a pair of cam-tracks or rails 33, 34, hinged together at their adjacent ends at 35 and each having a fulcrum pin and slot connection 36 with the wall of the enclosure.

One of such sections has a bent arm 37 hinged thereon and having a horizontal end or terminal portion 38.

When the hurdles are not used, each such auxiliary cam device remains flattened out in horizontal inactive relation above the main cam-track 31 so that the roller 29 will travel beneath it without contact therewith (see Figure 6), but, when the hurdles are erected or placed in position on the race-course, then each such extra articulated cam is bent at its elbow, as shown in Figure 5, bringing its two ends down to the main cam-track, the parts being maintained in this operative or active relation by a suitable support 39 placed beneath the arm section 28 and bridging the recess or cavity 41 in the wall normally occupied by such portion of the arm when the hurdles are not used.

When such added cam members are thus employed, the luring rabbit, besides making the usual small jumps effected or brought about by the comparatively small rises in the principal cam-track, makes greater or higher leaps over the barriers or hurdles by reason of the roller 29 running over the greater cam elevations afforded by the bent and now active complementary cam parts.

When the car is operating to entice and attract the dogs by reason of the rapidly moving lure or decoy over the race-track, the bent shaft or rabbit-supporting arm stands out from the car by reason of the inertia thereof and it is prevented from swinging unduly rearwardly by a block 42 on the ring 39 bearing on one of the rollers 26 as shown in Figure 1, but, when it is desired to have the rabbit disappear from the view of the dogs at the termination of the race, the electric-car is suddenly stopped, causing the rabbit, arm, and ring to swing forwardly automatically, due to their momentum, thus carrying the rabbit into the shadow of the eaves of the trackway enclosure (see Figure 4) where it cannot be seen by the dogs.

The rabbit is stopped in this position by reason of a wedge-block 43 on the ring pressing in under one of the rollers 46 (Figure 4) and stopping the forward movement of the previously inwardly-swinging members.

This invention is not limited or confined to the particular embodiment presented and is susceptible of a variety of embodiments varying more or less radically in mechanical details, but all incorporating the fundamental principles of the invention and having its salient benefits and advantages, the scope of the invention being defined by the appended claims.

I claim:

1. The combination of a carriage adapted to travel alongside of a race-course equipped with a cross hurdle, an arm mounted for oscillation on and adapted to outstand from said carriage, a lure on said arm, said hurdle being in the normal path of travel of said arm and lure, and means to rock said arm to elevate it and the lure to allow them to pass over such hurdle.

2. The combination of a carriage adapted to travel alongside a race-course equipped with a cross hurdle, a bent arm mounted for oscillation on and adapted to outstand from said carriage, a lure on said arm, said hurdle being in the normal path of travel of said arm and lure, and means to oscillate said arm to elevate it and the lure to allow them to pass over such hurdle.

3. The combination of a carriage adapted to travel alongside of a race-course equipped with a cross hurdle, a bent arm mounted for oscillation on and adapted to outstand from said carriage, a lure on said arm, said hurdle being in the normal path of travel of said arm and lure, and means including a cam to oscillate said arm to elevate it and the lure to allow them to pass over such hurdle.

4. The combination of a carriage adapted to travel alongside of a race-course equipped with a cross hurdle, a bent arm mounted for oscillation on and adapted to outstand from said carriage, a lure on said arm, said hurdle being in the normal path of travel of said arm and lure, and means including a stationary cam disposed lengthwise the race-course to oscillate said arm to elevate it and the lure to allow them to pass over such hurdle.

5. The combination of a carriage adapted to travel alongside of a race-course equipped with a cross hurdle, a bent arm mounted for oscillation on and adapted to outstand from said carriage, a lure on said arm, said hurdle being in the normal path of travel of said arm and lure, and means including a stationary cam disposed lengthwise the race-course to oscillate said arm to elevate it and the lure to allow them to pass over such hurdle, parts at least of said cam being adjustable to vary the heights of said lure jumping movements.

6. The combination of a carriage adapted to travel alongside of a race-course equipped with a cross hurdle, a bent arm mounted for oscillation on and adapted to outstand from said carriage, said arm being hinged on the carriage and adapted to swing forwardly from its outstanding position under the action of its momentum when the forward speed of the carrier is substantially reduced, a lure on said arm, said hurdle being in the normal path of travel of said arm and lure, and means to oscillate said arm to elevate it and the lure to allow them to pass over such hurdle.

7. In a dog racing track, a course for the dogs, a rail track positioned alongside the course, an electrically operated lure conveyer on the rail track, an arm carried by the conveyer and having an offset lure-supporting portion above the course, means for causing the arm to oscillate and raise the lure-supporting portion thereof at one or more points along the course, and means for selectively rendering inoperative said last mentioned means.

8. In a dog racing track, a course for the dogs, a conveyer track positioned alongside said course, an electrically operated lure conveyer on said conveyer track, an arm carried by the conveyer and having an offset lure supporting portion above the course, a lure mounted on said arm above the course, and means for causing said arm to oscillate around an axis substantially transverse to the course for raising said lure.

In witness whereof I have hereunto set my hand.

JOHN F. WHITE.